May 18, 1965
G. K. MINER
3,183,934
CAM-OPERATED VALVE
Filed Dec. 26, 1962
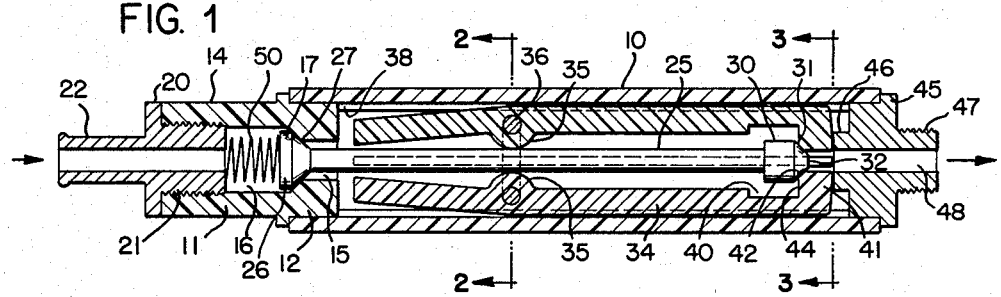
FIG. 1
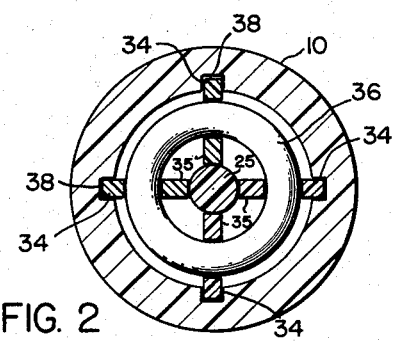
FIG. 2
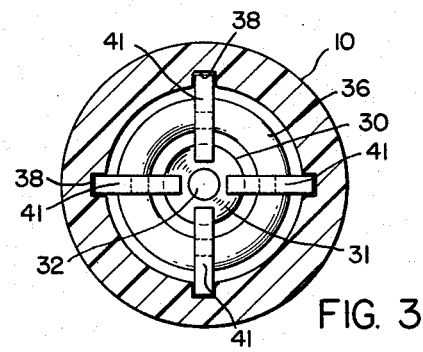
FIG. 3
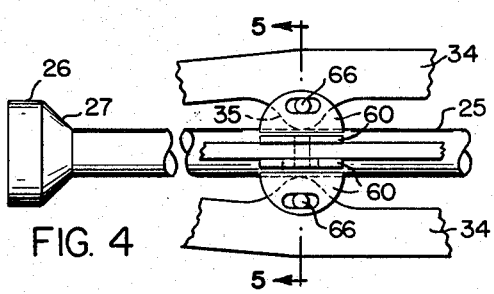
FIG. 4
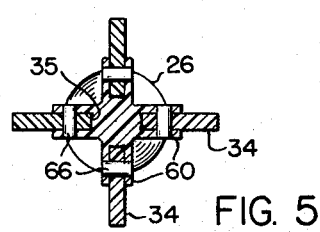
FIG. 5
FIG. 6
INVENTOR.
G. KENNETH MINER
BY
Cumpston & Shaw
ATTORNEYS

United States Patent Office 3,183,934
Patented May 18, 1965

3,183,934
CAM-OPERATED VALVE
George Kenneth Miner, R.R. 3, Box 1161,
Clinton St. Road, Batavia, N.Y.
Filed Dec. 26, 1962, Ser. No. 247,205
15 Claims. (Cl. 137—625.27)

This invention relates to a valve structure. More particularly, the invention relates to a new and improved structure for a valve that has structural features that permit its use to great advantage in a variety of applications.

For many applications, it is desirable to have a valve structure in which there are no paths of communication through the body of the valve other than the essential openings to provide for a fluid inlet and a fluid outlet. Such applications range from the simple garden hose valve, where conventional valves would permit leakage, to valves in pipe lines for corrosive chemicals, where ordinary types of valves must either be constructed from expensive, corrosion-resistant metallic alloys, or must be replaced frequently because of the rapidity with which corrosion occurs at and around the valve stem.

One object of the present invention is to provide a practical valve structure in which the valve body may be continuous and unbroken except for the fluid inlet and the fluid outlet.

Another object of the invention is to provide a new, practical valve structure that is simple to manufacture, and that is simple to operate.

Another object of the invention is to provide a valve structure that permits use of a valve as a quick-acting valve.

A further object of the invention is to provide a practical, inexpensive, non-leaking valve that is simple and easy to operate.

Still another object of the invention is to provide a practical valve for use with corrosive materials that is inexpensive to manufacture. A related object of the invention is to provide a valve of the character described that can be made from inexpensive but corrosion-resistant synthetic plastic materials.

Yet another object of the invention is to provide a valve of simple design that can be operated to move the valve between its open and closed positions, by external manipulation of the body of the valve, without movement of any member that projects through the body of the valve from its interior to its exterior.

A further object of the invention is to provide a simple valve structure that can be adjusted to any position between its fully open and fully closed positions, that can be locked in its fully open position or in its fully closed position, and that will normally return automatically to its closed position unless locked in its fully open position.

Still a further object of the invention is to provide a valve of the character described that can be connected to a high pressure pump, to provide a metered supply of fluid to the pump.

Other objects of the invention will be apparent hereinafter from the specification and from the recital of the appended claims. To attain these and other ends, the invention resides in certain improvements and combinations of parts, all as will hereinafter be more fully described, the novel features of the invention being pointed out in the claims at the end of this specification.

In the drawings:

FIG. 1 is an axial section of a valve that is constructed in accordance with one embodiment of this invention, and that is shown in its closed position;

FIG. 2 is a section on an enlarged scale, taken on the line 2—2 of FIG. 1, looking in the direction of the arrows;

FIG. 3 is a section on an enlarged scale, taken on the line 3—3 of FIG. 1, looking in the direction of the arrows;

FIG. 4 is a fragmentary section on an enlarged scale, showing the working parts of the interior of a valve that is constructed in accordance with a modified embodiment of the invention;

FIG. 5 is a section taken on the line 5—5 of FIG. 4, looking in the direction of the arrows, and FIG. 6 is a fragmentary axial section of a valve that is constructed in accordance with another embodiment of this invention, and that is designed for use in the intake line of a high pressure pump.

Referring now in detail to the drawings by numerals of reference, the numeral 10 denotes a generally cylindrical tube that is made from a resilient, flexible synthetic plastic material, and that forms the principal structural component of the body of the valve. A plug 11 is secured in one end of the tube 10. The plug 11 is formed with a reduced diameter extension 12 that is inserted in one end of the tube 10. The plug 11 is also formed with an elongate shank 14, that projects outwardly from tube 10. The reduced diameter part 12 and the shank part 14 of the plug are formed with bores 15 and 16 respectively, that are coaxial and that have lesser and greater diameters, respectively. The bores 15, 16 communicate through a neck that is formed by a generally conical shoulder 17.

The threaded part 21 of an adapter 20 is threaded into the end of the plug 11. The adapter 20 is formed with an external part 22 for connection to a fluid supply line.

An elongate valve element or rod 25 is mounted in the bore of the tube 10, to extend generally axially of the tube. The rod 25 is formed at one of its ends with an enlarged diameter part or valve closure member 26 that is disposed in the bores 15, 16 of the plug 11 and that is formed with a generally conical surface 27 that is complementary to the surface of the shoulder 17 and that is disposed for sealing engagement against the shoulder 17 in the closed position of the valve. At its other end, the rod 25 is formed with an enlarged diameter extension or head 30 that is formed with a generally conical surface 31 and with a flat end face 32 that is generally perpendicular to the lengthwise axis of the rod.

Four cam levers 34 are mounted in equiangularly spaced relation in the bore of the tube 10, about the rod 25. Each of the cam levers 34 is formed with a centrally located, radially inwardly projecting boss 35 that is formed with an opening therein through which a pivot ring 36 is passed to secure the four cam levers together. The tube 10 is formed with four longitudinally extending channels 38, in which the four cam levers 34 respectively are engaged.

Each of the cam levers 34 is formed adjacent its head end with a recessed portion 40 to provide clearance about the head 30 of the rod 25, and with a radially inwardly projecting finger 41 that is formed with an inclined cam surface 42 that engages against the conical surface 31 on the head 30.

Each of the fingers 41 is also formed with a surface 44 that lies in a plane that is generally perpendicular to the axis of the tube 10 and the axis of the rod 25.

A plug 45 is secured in the outlet end of the tube 10 and is formed with a reduced diameter portion 46 that has a radial face against which the ends of the fingers 41 engage. The plug 45 is also formed with an outwardly projecting threaded portion 47, having a bore 48 for connection to and communication with an outlet line.

A spring 50 is disposed in the bore 16 of the plug 11, and is interposed between the adapter 20 and the end 26 of the rod 25, constantly to urge the rod in one direction, to the closed position of the valve.

For use of the valve that is shown in FIGS. 1–3 in a garden hose, the valve parts can be formed from a synthetic plastic material such as, for example, polyvinyl chloride or polytetrafluoroethylene. In such a case, the tube 10 would be formed to be flexible, whereas the other valve parts would be rigid. Such a valve may be light in weight, corrosion resistant, inexpensive to manufacture, and capable of withstanding extremes in temperature.

To use a valve that is constructed in accordance with this embodiment of the invention, the adapter 20 is connected to a fluid supply line, and the plug 45 is connected to a discharge line. The valve is held in its closed position by the spring 50, which constantly urges the conical surface 27 on the rod 25 to engage in fluid-tight fashion against the shoulder 17. When the fluid supply line, to which the valve is connected, supplies fluid under pressure, the force that is exerted by the fluid against the face of the end part 26 of the rod 25 cooperates with the spring 50 to hold the valve in its closed position.

To open the valve, an inward compressive force is exerted on the tube 10, to force at least two of the cam levers 34 to pivot about the pivot ring 36 to cause their respective fingers 41 to move radially inwardly. As the fingers move inwardly, the tapered cam surfaces 42 exert a force on the conical surface 31 on the head 30 of the rod 25 and cause the rod to move axially to the left relative to FIG. 1, to disengage the conical surface 27 from its seat 17. This permits fluid to flow around the end part 26 of the rod between the conical surface 27 and its seat 17, through the bore 15, through the bore of the tube 10, around the head 30 of the rod, between the fingers 41 of the cam levers, and through the bore 48 of the plug 45 to the discharge line.

The rate at which fluid is permitted to flow through the valve can be adjusted by adjusting the extent to which the fingers 41 on the cam levers are moved radially inwardly. This, in turn, controls the amount of separation between the working face 27 of the valve member 25 and the seat 17.

To lock the valve in its fully open position, the levers 34 are manipulated to force the fingers 41 radially inwardly as far as they will go, and until the rod 25 has been moved to the left as far as it will go. At this point, the radical surfaces 44 of the fingers 41 engage against the radial end face 32 on the head of the rod. In this position, the levers are stable against further movement, and the valve is held in its fully open position.

To close the valve, compressive force is exerted on the tube 10 at its inlet end, to move the cam levers 34, to cause the fingers 41 to move radially outwardly, and the spring 50 will then automatically return the rod 25 to its closed valve position.

For some applications, where a superior closing seal is desired, a groove can be formed in the shoulder 17 of the plug 11, to accommodate an O ring. For many applications, however, the use of an auxiliary sealing device, such as an O ring, is unnecessary.

Moreover, while I prefer to construct the valve with the use of a spring that is disposed constantly to urge the valve to its closed position, in many applications where the valve is mounted in a line normally containing fluid under pressure, the fluid itself can be relied upon the urge the valve to its closed position.

Several expedients are available to hold the cam levers against rotation on the piovt ring 36. In the embodiment of the invention that is illustrated in FIGS. 1–3, the cam levers 34 engage in the channels 38 inside the tube 10, and prevented from rotation relative to each other in this way. Another structure for accomplishing the same purpose is shown in FIGS. 4 and 5, in which the rod 25 is formed with four sets of longitudinally extending pairs of arms 60. Each of the cam levers 34 is secured between one of the pairs of the arms 60 by a pivot pin 66. The channels 38 in the tube 10 may be omitted from this embodiment of the invention. This modified structure is used in the same manner as in the structure shown in FIGS. 1–3.

Referring now to FIG. 6, the numeral 10' denotes a rigid tube. A plurality of plungers 70 are mounted to project respectively through holes in the wall of the tube 10', where gaskets 69 are disposed to prevent leakage. The plungers 70 are coupled respectively to the levers 34. The plungers 70 are mounted respectively to project into the cores of electromagnet coils 71 that are mounted on the exterior of the tube 10' directly radially outward of each finger 41.

A plug 45' is secured in the end of the tube 10' at its discharge end. The plug 45' is formed with an elongate, outwardly projecting, generally cylindrical extension 72. At its outer end, the extension 72 is formed with an enlarged diameter bore 73 that communicates with the bore 48' of the plug 45', that in turn communicates with the bore of the tube 10'. The plug 45' is also formed with a plurality of angularly spaced, axially extending short bores 74 that communicate with the large diameter bore 73 and that also communicate with radially extending openings 75 through which the bores 74 communicate with the exterior.

A rod 76 is secured at one of its ends in the head 30' of the rod 25', and is mounted to project through the bore 48' of the plug 45'. A disc 77 is secured to the other end of the rod 76, in the bore 73. A ring of resilient material 78 is mounted in a groove in one face of the disc 77 to confront the short bores 74 in the plug 45'. The disc 77 is formed with a plurality of openings 80 therethrough that are disposed to be in alignment with the bore 48' of the plug 45'.

A bushing 82 is threaded into the outer end of the plug extension 72, to receive an adapter 84 to which a line 85 is secured. The line 85 is adapted to be connected to the intake of a compressor, a metering pump, or the like.

To open the valve, the electromagnets 71 are energized in such a way as to cause the plungers 70 to move together, inwardly of the tube 10'. When the plungers 70 move inwardly, the fingers 41 of the cam levers 34 are moved radially inwardly. This movement of the fingers 41 forces the rod 25' to move to the left relative to FIG. 6, to open the valve. At the same time, as the rod 25' is moved to the left, the rod 76 and its associated disc 77 are moved to the left. In the fully opened position of the valve, the gasket 78 that is carried on one face of the disc 77 is moved into sealing engagement with the bores 73. Fluid can then flow through the bore of the tube 10' through the bore 48' of the plug 45', the openings 80 in the disc 77, and the bore 73, to the discharge line 85.

When the valve is moved from its open position to its closed position, the disc 77 is returned to the position shown in FIG. 6, and any fluid that is trapped under pressure in the valve or in the discharge line can escape through the bores 74 and their associated openings 75 to the exterior of the valve.

In this embodiment of the invention, the plungers are secured directly to the cam levers, in which case the positions of the plungers provides a direct control over the position of the valve; and in this case, no spring is needed in the valve. Alternatively, additional plungers may be mounted at the other ends of the cam levers, so that one set of plungers would be moved in to open the valve, and the other set would be moved in to close the valve; and in this case, no direct connection between the plungers and the levers, and no spring, would be necessary.

While the invention has been disclosed herein by reference to the details of specific embodiments thereof, it is to be understood that such disclosure is intended in an illustrative rather than a limiting sense, and it is contemplated that various modifications in the construction and arrangement of the parts will readily occur to those skilled in the art, within the spirit of the invention and the scope of the appended claims.

I claim:

1. A valve comprising a body that is formed with a fluid inlet, a fluid outlet, and a chamber providing a passage between said inlet and said outlet, means disposed in said passage providing a valve seat, an elongate, rod-like element that is formed with a valve closure member and that is mounted for movement in one direction to move said member into engagement with said seat to close the valve to obstruct the flow of fluid through said passage and for movement in the opposite direction to move said member out of engagement with said seat to permit the flow of fluid through said passage, said element also being formed with cam follower surfaces that extend radially thereof and that are angularly spaced from each other, a plurality of levers that are mounted in said passage in angularly spaced relation to each other about said element, said levers being formed with cam surfaces respectively that are disposed in engagement with said cam follower surfaces respectively, said levers being mounted for pivotal movement radially of said element to effect movement of said element thereby to adjust the position of said valve closure member, for opening and closing said valve.

2. A valve in accordance with claim 1 wherein said cooperating cam surfaces and cam follower surfaces comprise a first set of cooperating surfaces respectively that are formed to permit said element and said valve closure member to be adjusted in position to and from the closed position of the valve and a second set of cooperating surfaces respectively that are formed to permit said element and said valve closure member to be stable in the fully opened position of the valve.

3. A valve in accordance with claim 1 wherein said valve body is formed from a flexible, self-sustaining, fluid-impervious material, whereby external manipulation of the valve body can be effected to adjust the positions of said levers respectively.

4. A valve in accordance with claim 1 wherein said valve body is rigid and is formed with openings to permit projection into and from said body of movable elements that are disposed to project into and from said body and that are disposed respectively to engage said levers to move said levers upon movement of said movable elements.

5. A valve mechanism comprising a body that is formed with a fluid inlet, a fluid outlet, and a chamber providing an elongate, generally cylindrical passage between said inlet and said outlet, said body being formed with a seat that extends transversely of and that is disposed about said passage, an elongate, rod-like element that is disposed in said passage to extend generally axially thereof and that is formed with an enlarged diameter part providing a valve closure member, said element being mounted for movement in one direction to move said members into engagement with said seat to close the valve to obstruct the flow of fluid through said passage and for movement in the opposite direction to move said member out of engagement with said seat to permit the flow of fluid through said passage, said element also being formed with cam follower surfaces that extend radially thereof and that are angularly spaced from each other, a plurality of elongate levers that are disposed in said passage to extend lengthwise thereof in angularly spaced relation to each other about said element, said levers being formed with cam surfaces respectively that are disposed in engagement with said cam follower surfaces respectively, said levers being mounted for pivotal movement radially of said element about pivot points that are axially spaced in said passage from said cam surfaces to effect movement of said element to adjust the position of the valve closure member to the closed position of the valve upon pivotal movement in one direction and to adjust the position of the valve closure member to an open position of the valve upon pivotal movement in the opposite direction.

6. A valve in accordance with claim 5 including spring means mounted constantly to urge said element in one direction to urge said enlarged diameter part into engagement with said seat.

7. A valve mechanism in accordance with claim 6 wherein said cooperating cam surfaces and cam follower surfaces comprise a first set of cooperating surfaces respectively that are formed to permit said element and said valve closure member to be adjusted in position to and from the closed position of the valve and with a second set of cooperating surfaces respectively that are formed to permit said element and said valve closure member to be stable in the fully opened position of the valve.

8. A valve mechanism in accordance with claim 5 wherein said valve body is formed from a flexible, self-sustaining, fluid-impervious material, whereby manipulation of the valve body can be effected to adjust the positions of said levers respectively.

9. A valve mechanism in accordance with claim 5 wherein said valve body is rigid and wherein means are mounted externally of the body to control the movements of said levers respectively.

10. A valve mechanism in accordance with claim 5 wherein said valve body is rigid and is formed with openings therethrough to permit the projection into and from said body of movable rod elements that are disposed to project into and from said body and that are coupled with said levers to move said levers upon movement of said movable rod elements, and wherein electrical coils are mounted on said body about said rod elements for controlling the movements of said rod elements.

11. A valve mechanism comprising a body that is formed with a fluid inlet, and fluid outlet, and a chamber providing an elongate, generally cylindrical passage between said inlet and said outlet, said body being formed with a seat that extends transversely of and that is disposed about said passage, an elongate, rod-like element that is disposed in said passage to extend generally axially thereof and that is formed with an enlarged diameter part providing a valve closure member, said element being mounted for movement in one direction to move said member into engagement with said seat to close the valve to obstruct the flow of fluid through said passage and for movement in the opposite direction to move said member out of engagement with said seat to permit the flow of fluid through said passage, said element also being formed with cam follower surfaces that extend radially thereof and that are angularly spaced from each other, a plurality of elongate levers that are disposed in said passage to extend lengthwise thereof in angularly spaced relation to each other and about said element, said levers being formed with radially inwardly-projecting fingers, said body being formed with a radially-extending surface in said chamber, said element being formed with a head and with cam follower surfaces on said head, said fingers being formed with cam surfaces respectively and being interposed between the radially-extending surface of said body and the cam follower surfaces on the head of said element, respectively, with the cam surfaces of said fingers engaging the cam follower surfaces of said head, respectively, said levers being mounted for pivotal movement radially of said element about pivot points that are spaced axially of said passage from said cam surfaces to effect movement of said element to adjust the position of the valve closure member to the closed position of the valve upon pivotal movement of the levers in one direction and to adjust the position of the valve closure member to an open position of the valve upon pivotal movement of the levers in the opposite direction, spring means mounted constantly to urge said element in one direction constantly to urge said member into engagement with said seat, said cooperating cam surfaces and cam follower surfaces comprising a first set of cooperating surfaces respectively that are formed to permit said element and said valve closure member to be adjusted in position to and from the closed position of the valve and with a second set of cooperating surfaces permitting said element and said member to be stable in the fully opened position of the valve.

12. A valve mechanism in accordance with claim 11 wherein said valve body is formed from a flexible, self-sustaining, fluid-impervious material, whereby manipulation of the valve body can be effected to adjust the positions of said levers respectively.

13. A valve mechanism in accordance with claim 11 wherein said valve body is rigid and wherein means are mounted externally of the body to control the movements of said levers respectively.

14. A valve mechanism in accordance with claim 11 wherein means are mounted on said body externally thereof for adjusting the positions of said levers respectively.

15. A valve mechanism for supplying fluid under pressure intermittently, comprising a body that is formed with a fluid inlet, a fluid outlet, and a chamber providing an elongate, generally cylindrical passage between said inlet and said outlet, said body being formed with a seat that extends transversely of and that is disposed about said passage, an elongate, rod-like element that is disposed in said passage to extend generally axially thereof and that is formed with an enlarged diameter part providing a valve closure member, said element being mounted for movement in one direction to move said member into engagement with said seat to close the valve to obstruct the flow of fluid through said passage and for movement in the opposite direction to move said member out of engagement with said seat to permit the flow of fluid through said passage, said element also being formed with cam follower surfaces that extend radially thereof and that are angularly spaced from each other, a plurality of elongate levers that are disposed in said passage to extend lengthwise thereof in angularly spaced relation to each other about said element, said levers being formed with cam surfaces respectively that are disposed in engagement with said cam follower surfaces respectively, said levers being mounted for pivotal movement radially of said element about pivot points that are spaced axially of said passage from said cam surface to effect movement of said element to adjust the position of the valve closure member to the closed position of the valve upon pivotal movement in one direction and to adjust the position of the valve closure member to an open position of the valve upon pivotal movement in the opposite direction, said body being formed with at least one escape opening therein on the outlet side of said valve seat, and closure means coupled to said element and disposed for engaging and sealing said escape opening in fluid-tight fashion when said element is in its fully opened position and for disengaging said escape opening when said element is in a position other than its fully opened position.

References Cited by the Examiner
UNITED STATES PATENTS

| | | | |
|---|---|---|---|
| 802,952 | 10/05 | Waterman | 251—257 |
| 1,663,701 | 3/28 | Hedges | 251—38 |
| 1,877,197 | 9/32 | Price | 251—239 |
| 1,987,843 | 1/35 | Svejda | 251—38 |
| 2,243,957 | 6/41 | Heine | 251—38 |

MARTIN P. SCHWADRON, *Acting Primary Examiner.*
M. CARY NELSON, *Examiner.*